United States Patent
Zhang et al.

(10) Patent No.: US 11,524,603 B2
(45) Date of Patent: Dec. 13, 2022

(54) PROMPTING METHOD OF BICYCLE INFORMATION, A DEVICE, A SERVER, AND A USER TERMINAL

(71) Applicant: Neutron Holdings, Inc., San Francisco, CA (US)

(72) Inventors: Xi Zhang, Shengzhen (CN); Yuxin Zhai, Shengzhen (CN); Xiaotao Xiao, Shengzhen (CN)

(73) Assignee: Neutron Holdings, Inc., San Francisco, CA (US)

(*) Notice: Subject to any disclaimer, the term of this patent is extended or adjusted under 35 U.S.C. 154(b) by 0 days.

(21) Appl. No.: 16/937,491

(22) Filed: Jul. 23, 2020

(65) Prior Publication Data
US 2020/0353840 A1   Nov. 12, 2020

Related U.S. Application Data

(63) Continuation of application No. PCT/CN2018/074579, filed on Jan. 30, 2018.

(51) Int. Cl.
*B60L 58/12* (2019.01)
*B60L 58/16* (2019.01)

(52) U.S. Cl.
CPC .............. *B60L 58/12* (2019.02); *B60L 58/16* (2019.02); *B60L 2200/12* (2013.01); *B60L 2250/16* (2013.01)

(58) Field of Classification Search
None
See application file for complete search history.

(56) References Cited

U.S. PATENT DOCUMENTS

| | | | |
|---|---|---|---|
| 2017/0039631 A1* | 2/2017 | Luke | G06Q 30/0645 |
| 2017/0059665 A1* | 3/2017 | Toya | H02J 7/005 |
| 2017/0364995 A1* | 12/2017 | Yan | B60L 53/31 |

FOREIGN PATENT DOCUMENTS

| | | |
|---|---|---|
| CN | 104467113 A | 3/2015 |
| CN | 104950728 A | 9/2015 |
| CN | 104960436 A | 10/2015 |
| CN | 105116817 A | 12/2015 |
| CN | 106355760 A | 1/2017 |
| CN | 106994901 A | 8/2017 |
| CN | 107134066 A | 9/2017 |
| CN | 107609664 A | 1/2018 |
| EP | 3110107 A1 | 12/2016 |

OTHER PUBLICATIONS

Search Report of the European from Appl'n No. 18903630 dated Dec. 13, 2021.

* cited by examiner

*Primary Examiner* — James J Lee
*Assistant Examiner* — David Hatch
(74) *Attorney, Agent, or Firm* — Dentons US LLP

(57) ABSTRACT

A bicycle information prompting method, a device, a server, and a user terminal are disclosed. The method comprises obtaining current power information of a target bicycle and sending the target bicycle to a user terminal associated with the target bicycle according to the current power information, so that the user terminal displays prompt information associated with the target bicycle.

12 Claims, 8 Drawing Sheets

PROMPTING METHOD OF BICYCLE INFORMATION, A DEVICE, A SERVER, AND A USER TERMINAL

CROSS REFERENCE TO RELATED APPLICATIONS

This application is a continuation of PCT application no. PCT/CN2018/074579, filed Jan. 30, 2018, which application is incorporated herein in its entirety by this reference thereto.

TECHNICAL FIELD

The present disclosure relates to the technical field of bicycle unlocking, for example, to a bicycle information prompting method, a bicycle information prompting device, a bicycle information prompting server, and a bicycle information prompting user terminal.

BACKGROUND

With the rapid development of technology, the convenient and pileless bicycles which are convenient and environmentally friendly have received more and more attention and use. For example, the use of pileless motorcycles has brought great convenience to people.

However, although pileless motorcycles are fast and labor-saving, they also have certain disadvantages. For example, some users have a problem with insufficient bicycle power during the course of riding and can only end their riding of the bicycle, which bring great inconvenience to users and make the user's experience poor.

SUMMARY

The embodiments of the present disclosure provide a bicycle information prompting method, a device, a server, and a user terminal to improve the unlocking control scheme and prevent users from being forced to ride a bicycle due to insufficient bicycle power during the course of riding.

A bicycle information prompting method applied to a server, comprises obtaining current power information of the target bicycle and sending bicycle data of the target bicycle to a user terminal associated with the target bicycle according to the current power information, so that the user terminal displays the prompt information associated with a battery life of the target bicycle, wherein the bicycle data is data information associated with the current power information of the target bicycle.

A bicycle information prompting method applied to a user terminal comprises receiving a bicycle data of a target bicycle according to a current power information of the target bicycle associated with a user terminal and displaying a prompt information associated with a battery lie of the target bicycle according to the bicycle data, wherein the bicycle data is data information associated with the current power information of the target bicycle.

A bicycle information prompting device applied to a server comprises a bicycle power acquiring module that is configured to obtain current power information of a target bicycle, and a prompt information determination module that is configured to send bicycle data of the target bicycle to a user terminal associated with the target bicycle according to the current power information, so that the user terminal displays prompt information associated with a battery life of the target bicycle, wherein the bicycle data is data information associated with the current power information of the target bicycle.

A bicycle information prompting device applied to a user terminal comprises a bicycle data receiving module that is configured to receive bicycle data of a target bicycle sent by the server according to current power information of the target bicycle associated with the user terminal and a prompt information displaying module that is configured to display prompt information associated with battery life of the target bicycle according to the bicycle data; wherein the bicycle data is data information associated with the current power information of the target bicycle.

A server, according to embodiments of the invention, comprises one or more processors and a storage device for storing one or more programs. When the one or more programs are executed by the one or more processors, the one or more processors implement the bicycle information prompting method of the present disclosure.

A user terminal comprises one or more processors and a storage device for storing one or more programs. The one or more programs are executed by the one or more processors. The one or more processors implement the bicycle information prompting method of the present disclosure.

The bicycle information prompting method, the device, the server, and the user terminal provided according to the embodiments of the present disclosure cause the user terminal to display the prompting information associated with the target bicycle's battery life, i.e. battery power. The embodiments of the present disclosure solve the problem that the user cannot know the battery information of the target bicycle in advance, which may cause the user to run out of battery power during course of riding, thereby causing the user to end the riding. Having this information improves the user experience.

DETAILED DESCRIPTION

Figure 1:
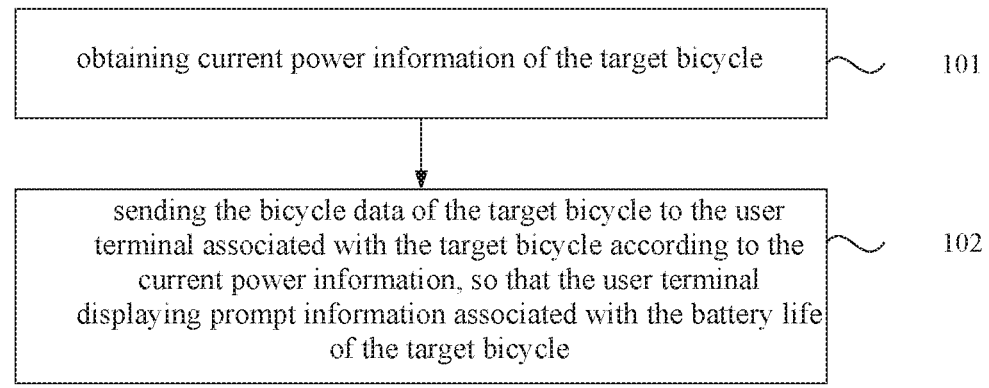
FIG. 1 is a schematic flowchart of a bicycle information prompting method provided by an embodiment of the present disclosure.

FIG. 1 is a schematic flowchart of a bicycle information prompting method provided by an embodiment of the present disclosure, which is applied to a server. The bicycle information prompting method of this embodiment may be applicable to prompt a user about a bicycle's battery life. The bicycle's battery life is determined by the server, the vehicle client of the user terminal, and the bicycle information prompt system installed on the bicycle. The bicycle information prompting method in this embodiment may be executed by a bicycle information prompting device configured in a server, and the device may be implemented in a manner as at least one of software and hardware. As shown in FIG. 1, the bicycle information prompting method may include the following:

Step 101: Obtaining the current power information of the target bicycle.

In an embodiment of the present disclosure, the target bicycle may be a device that relies on electrical energy as a source of energy, and converts electrical energy into mechanical motion through components such as a controller and a motor. A battery module for storing electric energy is usually installed inside these devices. The battery module is used to provide power or assist support for the target bicycle. The target bicycle can be equipment such as electric bicycles, electric mopeds, or electric scooters that are common in daily life. For example, the target bicycle can be a pileless bicycle that is commonly rented in public places. The current power amount information may be parameter information of a power amount of a battery module that stores power in the target bicycle.

In one embodiment of the present disclosure, the power information in the message information of the neighboring time or the current time sent by the target bicycle according to a preset time is obtained as the current power information. Optionally, the target bicycle may send message information to the server at a preset time interval or at a preset time point, and the message information may include the power information of the target bicycle. When obtaining the power information of the target bicycle, the message information of the target bicycle at the neighboring time or the current time can be obtained, and the power information of the target bicycle is obtained from the message information as the current power information. Optionally, the message information may further include geographic location information of the target bicycle. The preset time may be a static value set in the target bicycle or a dynamic value that is changed according to the motion status of the target bicycle. The preset time is a set time interval or a time point, for example, the target bicycle can send message information to the server every ten minutes, or the target bicycle can send message information to the server at a set fixed time point (8, 9, or 12 o'clock, etc.)). It should be noted that the time intervals and time points provided in this embodiment are merely examples and the embodiment of the present disclosure does not limit them.

In an embodiment of the present disclosure, the server may also directly send the power query information to the target bicycle to query the current power information of the target bicycle, and receive the current power information of the target bicycle sent by the target bicycle according to the power query information as the current power of the target bicycle information.

Step 102: Sending the bicycle data of the target bicycle to the user terminal associated with the target bicycle according to the current power information, so that the user terminal displays prompt information associated with the battery life of the target bicycle.

In an embodiment of the present disclosure, the user terminal may be a device that is associated with the target bicycle, and the user may view related information of the target bicycle through the user terminal. For example, the user terminal may be a mobile phone, a tablet computer, or the like, and the user may see the target bicycle in the client terminal of the user terminal. The bicycle data may be data information related to the current power information of the target bicycle. The bicycle data may be converted, corresponded, and calculated to obtain the content of the prompt information associated with the battery life of the target bicycle. That is, after obtaining the target bicycle power information, the server can send the bicycle data related to the current bicycle power information of the target bicycle to the user terminal, so that the user terminal can process the bicycle data to determine the current battery power of the target bicycle. The content of the prompt information may be the current power information of the target bicycle. Optionally, the battery life of the target bicycle may further include the distance, e.g. mileage, that the bicycle can continue to travel (that is, the remaining mileage) and time parameters that the target bicycle can continue to travel.

In the embodiment of the present disclosure, the current battery power information of the target bicycle is obtained, and the bicycle data of the target bicycle is sent to the user terminal associated with the target bicycle according to the current power information, so that the user terminal displays the prompt information associated with the battery life (that is, power) of the target bicycle. The embodiment of the present disclosure solves the problem that the user cannot know the battery information of the target bicycle in advance, which may cause the user to run out of battery power during the course of riding, thereby causing the user to end the riding. This information improves the user experience.

Figure 2:
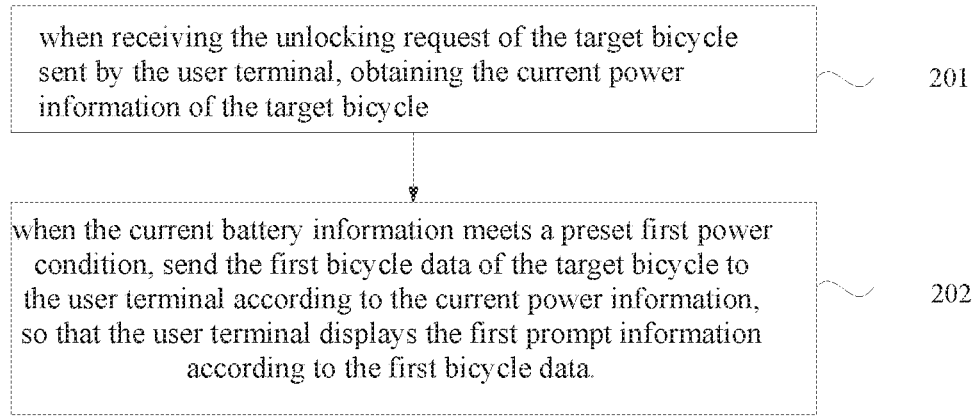
FIG. 2 is a schematic flowchart of a bicycle information prompting method according to another embodiment of the present disclosure.

FIG. 2 is a schematic flowchart of a bicycle information prompting method provided by an embodiment of the present disclosure, which is applied to a server. The bicycle information prompting method of this embodiment can be applied to a situation where a user unlocks an electric bicycle. The bicycle unlocking process may need the server, the user client of the user terminal, and the bicycle information prompt system consisting of an unlocking control terminal installed on the bicycle to cooperate. The bicycle information prompting method in this embodiment is specifically executed by a bicycle information prompting device configured in a server, and the bicycle information prompting device may be implemented in a manner at least one of software and hardware. As shown in FIG. 2, the bicycle information prompting method may include the ffollowing:

Step 201: When receiving the unlocking request of the target bicycle sent by the user terminal, obtaining the current power information of the target bicycle.

In an embodiment of the present disclosure, when the user unlocks a bicycle through the user terminal, the server may receive the unlocking request of the target bicycle sent by the user through the user terminal. The server can obtain the current battery information of the target bicycle according to the unlocking request of the target bicycle.

Optionally, after receiving the unlocking request sent by the user through the user terminal, the server may obtain the current power information of the target bicycle according to identification information of the target bicycle carried in the unlocking request. Optionally, the unlocking request may carry the identification information of the bicycle that the user needs to unlock. The identification information may include identification information of the user terminal and identification information of the target bicycle that the user needs to unlock. The identification information of the user terminal may be a mark for identifying the identity of the user terminal, or it may be registration information of the user terminal. For example, the number information of a subscriber identification module (SIM) in a user terminal and the registration information of an application installed on the user terminal during login can be used as the identification information of the user terminal. The identification information of the bicycle may be a sign for identifying the identity of the bicycle. For example, each bicycle has a unique vehicle number, which can be a string of numbers, letters, or a combination of both.

In an embodiment of the present disclosure, the unlocking request may be generated when the user scans the two-dimensional code information of the bicycle through the user client on the user terminal when the bicycle is unlocked, or directly enters the bicycle number of the target bicycle on the user client and then generates the unlocking request of the target bicycle. The unlocking request may also be a request for unlocking the bicycle generated by the user through a user terminal to the server, generated by sending a short message, or by dialing a public telephone number provided to the user for unlocking the bicycle.

Optionally, according to the identification information of the target bicycle in the unlocking request, the battery information in the message information of the neighboring moment or the current moment sent by the target bicycle at a preset time is obtained as the current battery information.

In an embodiment of the present disclosure, the target bicycle may send message information to the server at a preset time interval or at a preset time point. After receiving the unlocking request sent by the user through the user terminal according to the identification information of the target bicycle carried in the unlocking request, the message information sent by the target bicycle to the server at the immediate moment when the unlocking request is received or the current moment when the unlocking request is received. The message information includes the battery information of the target bicycle when the target bicycle sends the message information to the server. Then, the battery information carried in the message information is used as the current battery information of the target bicycle. The preset time may be a static value set in the target bicycle, or a dynamic value that changes according to the movement status of the target bicycle. For example, the preset time may be a set time interval or a time point. For example, the target bicycle may send message information to the server every ten minutes, or send message information to the server at a set fixed time point (such as 8 o'clock, 9 o'clock, or 12 o'clock, etc.). The time intervals and time points provided in the embodiment are merely examples, and the embodiment does not limit them.

In an embodiment of the present disclosure, the server may send the battery query information to the target bicycle to query the current battery information of the target bicycle according to the identification information of the target bicycle in the unlocking request, and receive the current battery information of the target bicycle sent by the target bicycle according to the battery query information. The received current battery information is used as the current battery information of the target bicycle.

Step 202: When the current battery information meets a preset first power condition, send the first bicycle data of the target bicycle to the user terminal according to the current power information, so that the user terminal displays the first prompt information according to the first bicycle data.

The first prompt information includes the battery life of the target bicycle and information for user feedback, which includes at least one of the following: continuing to ride the bicycle and canceling the riding of the bicycle.

In an embodiment of the present disclosure, the preset first power condition may be a preset first power range. When the current power of the target bicycle is within the preset first power range, the current power information of the target bicycle meets the preset first power condition. When the current power of the target bicycle is not in the preset first power range, the current power information of the target bicycle does not meet the preset first power condition. In one embodiment of the present disclosure, the preset first power range is 1%-5% of the total power of the target bicycle, and the preset first power condition may reflect a situation that the power of the bicycle is insufficient. Optionally, the preset first power condition can also be adjusted appropriately according to the storage size of the target bicycle's total power. When the target bicycle's total power is small, to ensure the smooth riding after unlocking the preset first power condition may be adjusted higher. Similarly, when the total power of the bicycle is large, the range of the preset first power condition can be adjusted lower. For example, the range of the preset first power condition is 1%-5% of the total power of the target bicycle. When the total power of the bicycle is large, the preset first power range may be lowered, and the range of the adjusted first power condition can be 0.4%-0.9% of the total power of the target bicycle.

In an embodiment of the present disclosure, the first bicycle data may be data that has a corresponding relationship with the first prompt information associated with the target bicycle battery life. The content of the prompt message can be determined by calculating the first bicycle data associated with the target bicycle battery life. For example, the first bicycle data may comprise one or more code parameters. After the code parameters are transmitted to the terminal, the content of the first prompt information may be determined according to the correspondence between the code parameters and the first prompt information. In an embodiment, the first prompt information includes a battery life of the target bicycle. The battery life may include information that the bicycle can continue on a mileage or a time parameter of the target bicycle.

The first prompt information may also be information for user feedback that includes at least one of the following: continuing riding the bicycle and cancelling riding the bicycle. That is, the first prompt information may be a "Continue to ride the bicycle" option that provides user feedback, or a "Cancel riding the bicycle" option that provides user feedback, or it may include both "Continue to ride the bicycle" and "Cancel riding the bicycle" for users to provide feedback. For example, if the first prompt information includes two options of "Continue to ride the bicycle" and "Cancel riding the bicycle," the user terminal may prompt the user during the unlocking process to choose whether to continue to ride the target bicycle or to cancel riding the target bicycle, so that the user can use the user terminal to provide the feedback information of "choose to continue riding the target bicycle" or "cancel riding the target bicycle."

In an embodiment of the present disclosure, the preset first power condition may be that the current power information of the target bicycle can support the target bicycle to continue to travel for a period of time (or a section of kilometers), but the remaining travel time is not long (or the remaining number of kilometers traveled is small). The first bicycle data may be data information about the battery life of the target bicycle, wherein the data information is configured by the server on the target bicycle based on a preset first power condition that the target bicycle meets. Because the first bicycle data is data information that is transmitted between the server and the user terminal and carries special information, the user terminal can convert the first bicycle data into characters (first prompt information) that the user can understand after receiving the first bicycle data. That is, the first prompt message may be character information provided by the user for display on a display interface of the user terminal.

Figure 3:
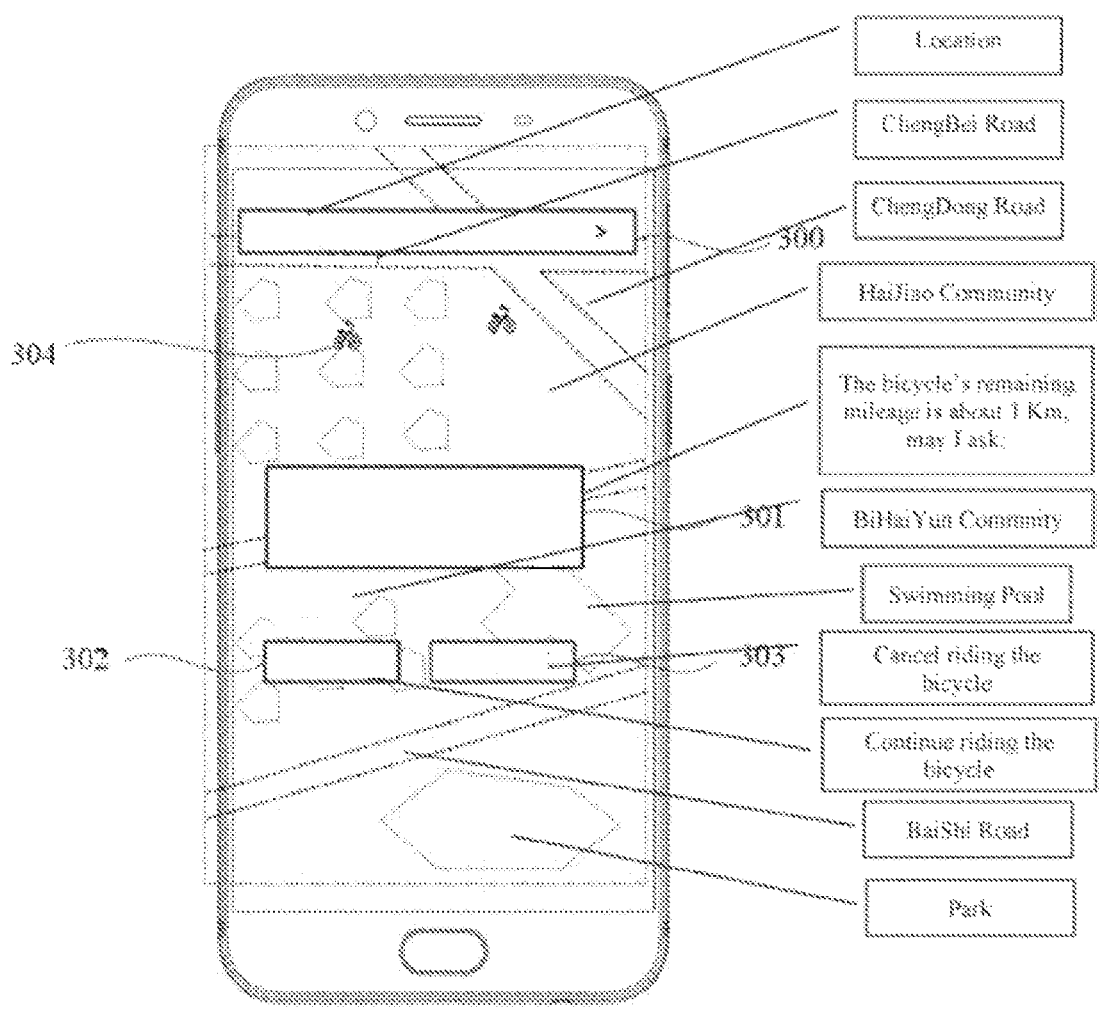
FIG. 3 is a schematic diagram of a first prompt message according to an embodiment of the present disclosure.

Exemplarily, FIG. 3 is a schematic diagram of a composition of the first prompt information in an embodiment of the present disclosure. FIG. 3 shows a bicycle appointment page 300, a first prompt content 301, a first feedback content 302, a second feedback content 303, and a target bicycle 304. The first prompt information may include a first prompt content 301, a first feedback content 302, and a second feedback content 303. The first prompt content 301 is configured to prompt the user regarding the current battery life of the target bicycle 304. For example, the first prompt content 301 may be "The bicycle's mileage is about 1 km, may I ask:", "The bicycle's life time is about 10 minutes, may I ask:" or "The bicycle has a low battery and the bicycle's mileage is about 1 km, may I ask:" and so on. The first feedback content 302 may be a first selection made by the user according to the first prompt content 301, and the second feedback content 303 may be a second selection made by the user according to the first prompt content 301. For example, the first feedback content 302 may be the same or similar content such as "going to ride the bicycle" or "continuing riding the bicycle," and the second feedback content 303 may be the same or similar content such as "cancelling riding the bicycle." In an embodiment of the present disclosure, the first prompt content 301 may also be "The bicycle' mileage is about 1 km, may I continue to ride the bicycle." The corresponding first feedback content 302 may be "Yes," the second feedback content 303 may be "No." The first prompt information in this form is also within the protection scope of the embodiment of the present disclosure.

In an embodiment of the present disclosure, when the server determines that the current power information of the target bicycle satisfies a preset first power condition, the first bicycle data of the target bicycle may be sent to the user terminal according to the current power information, so that the user terminal may display the first prompt information according to the first bicycle data. When the current power of the target bicycle meets the preset first power condition, the user can select whether to unlock the target bicycle according to the first prompt information on the user terminal. When the current power of the target bicycle does not meet the preset first power condition, it indicates that the power of the bicycle cannot meet the far riding conditions of the user, and an unlocking instruction can be directly sent to the target bicycle to unlock the bicycle.

Optionally, after sending the first bicycle data of the target bicycle to the user terminal according to the current power information, the method further includes receiving a feedback result on the first prompt information sent by the user terminal, and determining, according to the feedback result, whether to send an unlocking instruction to the target bicycle, or determining whether a feedback result has been received and determining whether to send an unlocking instruction to the target bicycle according to the determination result.

In an embodiment of the present disclosure, the first bicycle data of the target bicycle is sent to the user terminal according to the current power information, so that after the user terminal displays the first prompt information based on the first bicycle data, the user may provide feedback through the user terminal according to the first prompt information. After the user provides feedback on the first prompt information sent to the user terminal through the user terminal, the server may also receive the feedback result provided by the user on the first prompt information sent from the user terminal and determine whether or not that the target bicycle should send an unlocking instruction, so that the target bicycle completes the unlocking operation according to the unlock instruction; or the server determines whether a feedback result is received and determines whether to send an unlocking instruction to the target bicycle according to the determination result. The feedback result may be a selection made by the user on the first prompt information through the user terminal, and the result of the selection is used as a feedback result on the first prompt information. The unlocking instruction may be an instruction to unlock the bicycle. When the bicycle receives the unlocking instruction, the bicycle controls the lock device to unlock the bicycle directly.

In an embodiment of the present disclosure, it is determined whether to send an unlocking instruction to the target bicycle according to the feedback result or the determination result. For example, when the feedback result is a request to continue to ride the bicycle, an unlocking instruction is sent to the target bicycle to unlock the target bicycle or, when the feedback result is a request to cancel riding the bicycle, no unlocking instruction is sent to the target bicycle or, when the determination result is that no feedback result on the first prompt information sent by the user terminal is received at a preset time interval, no unlocking instruction is sent to the target bicycle.

In an embodiment of the present disclosure, the user may make feedback on the first prompt information through the user terminal. Referring to FIG. 3, the feedback result may be information of the first feedback content 302 or the second feedback content 303 in the first prompt information. The feedback content 302 may be, for example, content such as "Continue to ride the bicycle" or "go to ride the bicycle," and the second feedback content 303 may be, for example, content such as "Cancel to ride the bicycle."

When the feedback result is a request to continue to ride the bicycle, an unlocking instruction is sent to the target bicycle to unlock the target bicycle, so that the target bicycle is unlocked according to the unlock instruction. In addition, when the determination result is that the feedback result of the first prompt information sent by the user terminal is not received at a preset time interval (that is, a preset duration), no unlocking instruction is sent to the target bicycle, and the unlocking operation process of the target bicycle ends. The preset time interval may be adjusted according to the situation. For example, the preset time interval may be 1-5 minutes. That is, the preset duration may refer to a set length of time after the user terminal displays the first prompt message. For example, it may be that after the user terminal displays the first prompt message, if no user feedback is received within five minutes, the server judges that the feedback result is not received.

In an embodiment of the present disclosure, receiving a feedback result on the first prompt information sent by the user terminal and determining whether to send an unlocking instruction to the target bicycle according to the feedback result may also include the ffollowing:

When the feedback result is a request to cancel the bicycle ride, the second bicycle data of the target bicycle is sent to the user terminal according to the feedback result, so that the user terminal displays the second prompt information according to the second bicycle data. The second prompt information may be used to prompt the user that there are other candidate bicycles in a preset area of the geographic location of the target bicycle.

In an embodiment of the present disclosure, the second bicycle data may be data having a certain correspondence relationship with the second prompt information, and the content of the second prompt information may be determined by calculating the second bicycle data in a certain manner. For example, the second bicycle data may comprise code parameters. After the code parameters are transmitted to the user terminal, the content of the second prompt information may be determined according to the correspondence between the code parameters and the second prompt information.

In an embodiment of the present disclosure, the second prompting information may include at least one of the following: information prompting the user to select a candidate bicycle, information that the candidate bicycle's position parameters, and information of canceling riding the bicycle. The candidate bicycle is a pre-located bicycle located in a preset area of the geographic location of the target bicycle.

In an embodiment of the present disclosure, the candidate bicycle may be a bicycle that is located in a preset area of the geographic location of the target bicycle and it meets a preset third power condition. The preset third power condition may be a preset third power range. When the current power of the bicycle is within the preset third power range, it is determined that the current power information of the bicycle meets the preset third power condition; when the current power of the bicycle is not in the preset third power range, it is determined that the current power information of the bicycle does not meet the preset third power condition. Exemplarily, the preset third power range may be greater than 20% of the total power of the bicycle. The preset area may be an area formed by a preset distance extending outward from the target bicycle as the center. For example, if the preset distance is set to 300 meters, the preset area may be a circular area extending 300 meters outward from the target bicycle as the center.

Figure 4:
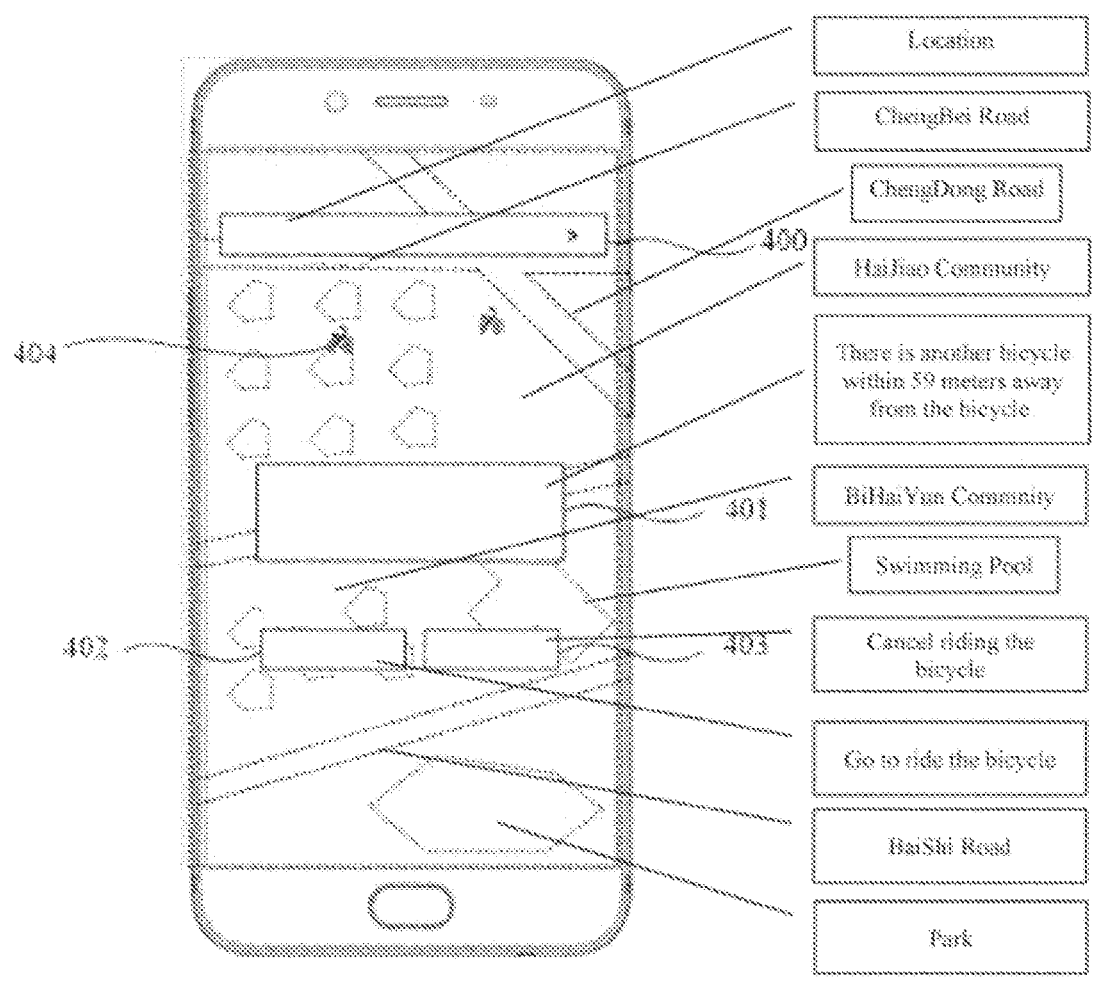
FIG. 4 is a schematic diagram of a composition of a second prompt message provided by an embodiment of the disclosure.

In an embodiment of the present disclosure, FIG. 4 is a schematic diagram of the composition of the second prompt information in an embodiment of the disclosure. FIG. 4 shows bicycle appointment page 400, a second prompt content 401, a third feedback content 402, a fourth feedback content 403, and a target bicycle 404. The second prompt information may include a second prompt content 401, a third feedback content 402, and a fourth feedback content 403. The second prompt content 401 is configured to prompt the user that there is information about other candidate bicycles in a preset area of the geographic location of the target bicycle 404. The second prompt content 401 may be, for example, information of a position parameter of a candidate bicycle that satisfies a preset second power condition in a preset region of the geographic location of the target bicycle 404. The third feedback content 402 and the fourth feedback content 403 may be information of two kinds of feedback selection. The third feedback content 402 includes information of selecting a candidate bicycle to ride. The candidate bicycle is a bicycle that is located in a predetermined area of the geographical location of the target bicycle and meets a predetermined third power condition. The fourth feedback content 403 includes information of canceling riding the target bicycle.

Exemplarily, the second prompt content may be the same or similar content such as "there is another bicycle within 59 meters away from the bicycle," "there is another bicycle with sufficient power at 66 meters away from the bicycle," or "the bicycle has insufficient power and is far from the bicycle 59 meters away, there is another fully charged bicycle." The third feedback content 402 may be the first choice that the user wants to make according to the second prompt content, and the fourth feedback content 403 may be the second choice that the user wants to make according to the second prompt content. For example, the third feedback content may be the same or similar content such as "going to ride a bicycle," "ride a candidate bicycle," or "ride another bicycle." When the user selects "going to ride a bicycle" on the user terminal, the user is guided to find out where the candidate bicycles prompted in the second prompt content through the map on the user terminal are located. The fourth feedback content may be the same or similar content such as "cancel to ride a bicycle." When the user selects "cancel to ride a bicycle" in the user terminal, no unlocking instruction is sent to the target bicycle, and the process of unlocking the target bicycle ends.

In an embodiment of the present disclosure, the second prompt content 401 may also be "There is another bicycle within 59 meters away from the bicycle, may I use another bicycle," "There are other bicycle with sufficient power at 66 meters away from the bicycle;" "I'm using another bicycle with sufficient power," or "This bicycle is with insufficient power, and there is another bicycle with sufficient power 59 meters away from the bicycle. Will you use another bicycle with sufficient power." Correspondingly, the third feedback content 402 may be "Yes" and the fourth feedback content 403 may be "No." The second prompt information in this form is also within the protection scope of the embodiment of the present disclosure. In addition, the second prompt information may also include the fourth feedback content 403 separately.

Optionally, when sending the first bicycle data of the target bicycle to the user terminal so that the user terminal displays the first prompt information according to the first bicycle data, the method further includes the following:

The unlocking instruction of the target bicycle is sent to the user terminal so that, after the user terminal determines that the user continues to ride the bicycle, the user terminal sends the unlocking instruction directly to the target bicycle through the Bluetooth communication protocol of the user terminal to unlock the target bicycle.

In an embodiment of the present disclosure, when the first bicycle data of the target bicycle is sent to the user terminal, the user terminal displays the first prompt information according to the first bicycle data. An unlocking key of the target bicycle and the first bicycle data may be simultaneously sent to the user terminal, so that when the user determines to continue riding the bicycle according to the first prompt information, the user can directly send the unlock key of the target bicycle in the unlocking instruction to the target bicycle through the Bluetooth communication protocol of the user terminal, thereby unlocking the bicycle. When the feedback result is a request to cancel the riding of the bicycle, no unlocking instruction is sent to the target bicycle, and the process of unlocking the target bicycle ends.

In the embodiment of the present disclosure, when receiving the unlocking request of the target bicycle sent by the user terminal, the current power information of the target bicycle is obtained. When the current power information meets the preset first power condition, the first bicycle data is sent to the user terminal according to the current power information. The user terminal displays the first prompt information according to the first bicycle data. The embodiment of the present disclosure can solve the problem that the user does not know the battery life of the target bicycle when unlocking the bicycle, which may cause the user to end the riding due to the endurance situation (that is, insufficient power) during the course of riding. That is, when unlocking the bicycle, the battery life of the target bicycle can be prompted, so that the user can decide whether to perform a subsequent unlocking operation on the target bicycle according to the first prompt information.

Figure 5:
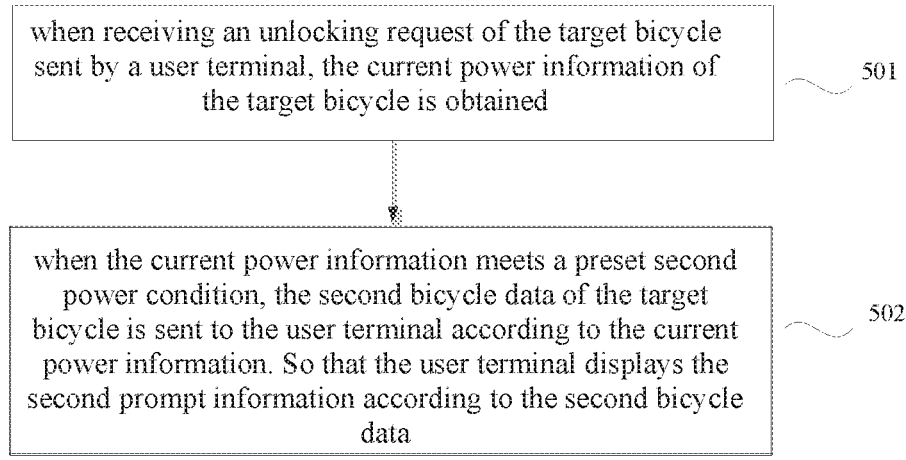
FIG. 5 is a schematic flowchart of a bicycle information prompting method according to another embodiment of the disclosure.

FIG. 5 is a schematic flowchart of a bicycle information prompting method provided by an embodiment of the present disclosure. As shown in FIG. 5, the bicycle information prompting method may include the following:

Step 501: When receiving an unlocking request of the target bicycle sent by a user terminal, the current power information of the target bicycle is obtained.

Step 502: When the current power information meets a preset second power condition, the second bicycle data of the target bicycle is sent to the user terminal according to the current power information and the user terminal displays the second prompt information according to the second bicycle data.

The second prompt information includes at least one of the following: information prompting the user to select a candidate bicycle, information prompting position parameter of the candidate bicycle, and cancelling the bicycle. The candidate bicycle is located in a preset area of the geographic location of the target bicycle and meets the requirements of the preset third battery condition.

In an embodiment of the present disclosure, the preset second power condition may be a preset second power range. When the current power of the target bicycle is within the preset second power range, it is determined that the current power information of the target bicycle meets the preset second power condition. When the current power of the target bicycle is not within the preset second power range, it is determined that the current power information of the target bicycle does not satisfy the preset second power condition.

In an embodiment of the present disclosure, the preset second power condition may be that the current power information of the target bicycle is seriously insufficient. Under the condition that the current power information of the target bicycle is seriously insufficient, the feedback result received by the user is "cancelling riding the bicycle." For example, that the current power information of the target bicycle is seriously insufficient may be that the current power information is 1% of the total power of the target bicycle. The second bicycle data may be that a server provides the user with data information of the candidate bicycle according to the preset second power condition that the target bicycle meets.

Exemplarily, the preset second power range may be less than 1% of the total power of the target bicycle. When the current power of the target bicycle is greater than 1% of the total power of the target bicycle, it is determined that the current power information of the target bicycle does not meet the preset second power condition. When the obtained current power of the target bicycle is less than 1% of the total power of the bicycle, it is determined that the current battery information of the target bicycle meets the preset second battery condition. Optionally, the candidate bicycle may be a bicycle that is located in a predetermined area of the geographical location of the target bicycle and meets a predetermined third power condition. The preset third power condition may be a preset third power range. When the current power of the bicycle is within the preset third power range, it is determined that the current power information of the bicycle meets the preset third power condition. When the current power is not within the preset third power range, it is determined that the current power information of the bicycle does not meet the preset third power condition. Exemplarily, the preset third power range is greater than 20% of the total power of the bicycle. The preset area may be an area formed by a preset distance extending outward from the target bicycle as the center. For example, if the preset distance is set to 300 meters, the preset area may be a circular area extending 300 meters outward from the target bicycle as the center.

In an embodiment of the present disclosure, the preset first power condition, the preset second power condition, and the preset third power condition, as well as the settings of the second bicycle data and the second prompting information, may refer to the foregoing embodiments. In addition, the preset first power condition, the preset second power condition, and the preset third power condition may also be an actual power range value, not just a percentage range, which is not limited in the embodiments of the present disclosure.

In the embodiment of the present disclosure, when receiving the unlocking request of the target bicycle sent by the user terminal, the current power information of the target bicycle is obtained, and when the current power information meets the preset second power condition, the second bicycle data is sent to the user terminal according to the current power information. The user terminal displays the second prompt information according to the second bicycle data. The second prompt information includes at least one of the following: information prompting the user to select a candidate bicycle, information of position parameter about candidate bicycle, and cancelling riding the bicycle. The embodiment of the present disclosure can solve the problem that the user does not know the battery life of the target bicycle when unlocking the bicycle, which may cause the user to end the riding due to the endurance situation (that is, insufficient power) during the course of riding the bicycle. That is, when unlocking the bicycle, the battery life of the bicycle can be prompted, so that the user can decide whether to use the candidate bicycle according to the second prompt information.

Figure 6:
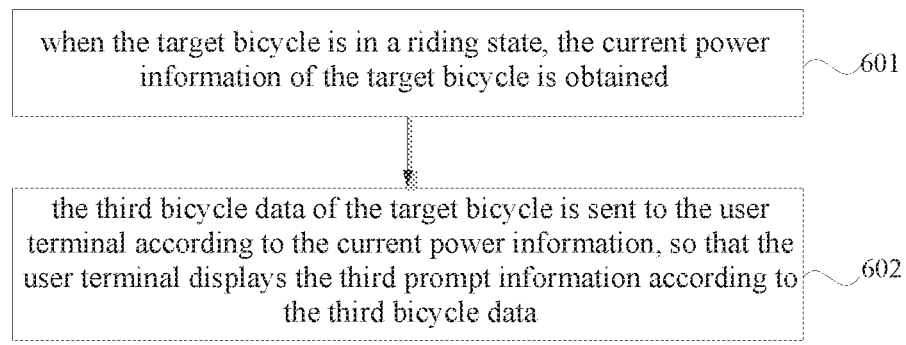
FIG. 6 is a schematic flowchart of a bicycle information prompting method according to another embodiment of the disclosure.

FIG. 6 is a schematic flowchart of a bicycle information prompting method provided by an embodiment of the present disclosure. As shown in FIG. 6, the bicycle information prompting method may include the following:

Step 601: When the target bicycle is in a riding state, the current power information of the target bicycle is obtained.

In an embodiment of the present disclosure, when the target bicycle is in a riding state, the current power information of the target bicycle can be obtained according to a preset time. Optionally, when the target bicycle is in a riding state, the power information in the message information of the neighboring time or the current time sent by the target bicycle according to the preset time is obtained, and the obtained power information in the message information is the current power information. Optionally, the target bicycle may send the message information to the server at a preset time interval or at a preset time point, and the message information may include the power information of the target bicycle. When the power information of the target bicycle needs to be obtained, the server can obtain the message information of the neighboring time or the current time of the power information of the target bicycle, and obtain the power information of the target bicycle from the message information as the current battery information. In addition, the message information may also include geographic location information of the target bicycle.

Optionally, the server may also directly send the power query information to the target bicycle to query the current power information of the target bicycle and receive the current power information of the target bicycle sent by the target bicycle according to the power query information. The received power information is the current power information of the target bicycle.

Step 602: The third bicycle data of the target bicycle is sent to the user terminal according to the current power information, so that the user terminal displays the third prompt information according to the third bicycle data.

The third prompt information includes at least one of the following: the mileage and time parameter of the target bicycle.

In an embodiment of the present disclosure, the third bicycle data may be data that has a certain correspondence with the third prompt information of the target bicycle, and the content of the third prompt information associated with the target bicycle may be determined by calculating the third bicycle data in a certain manner. For example, the third bicycle data may comprise code parameters. After the code parameters are transmitted to the user terminal, the detailed content of the third prompt information may be determined according to the correspondence between the code parameters and the third prompt information.

In an embodiment of the present disclosure, the third bicycle data may be at least one of data information, such as the riding time of the target bicycle, the number of kilometers of riding possible, and the battery life of the target bicycle provided by a server according to the current power information of the target bicycle during the course of riding. The third prompt information may be at least one of character information such as a riding time, the number of kilometers of riding possible, and a battery life of the target bicycle, which is displayed on the page of the user terminal.

Figure 7:
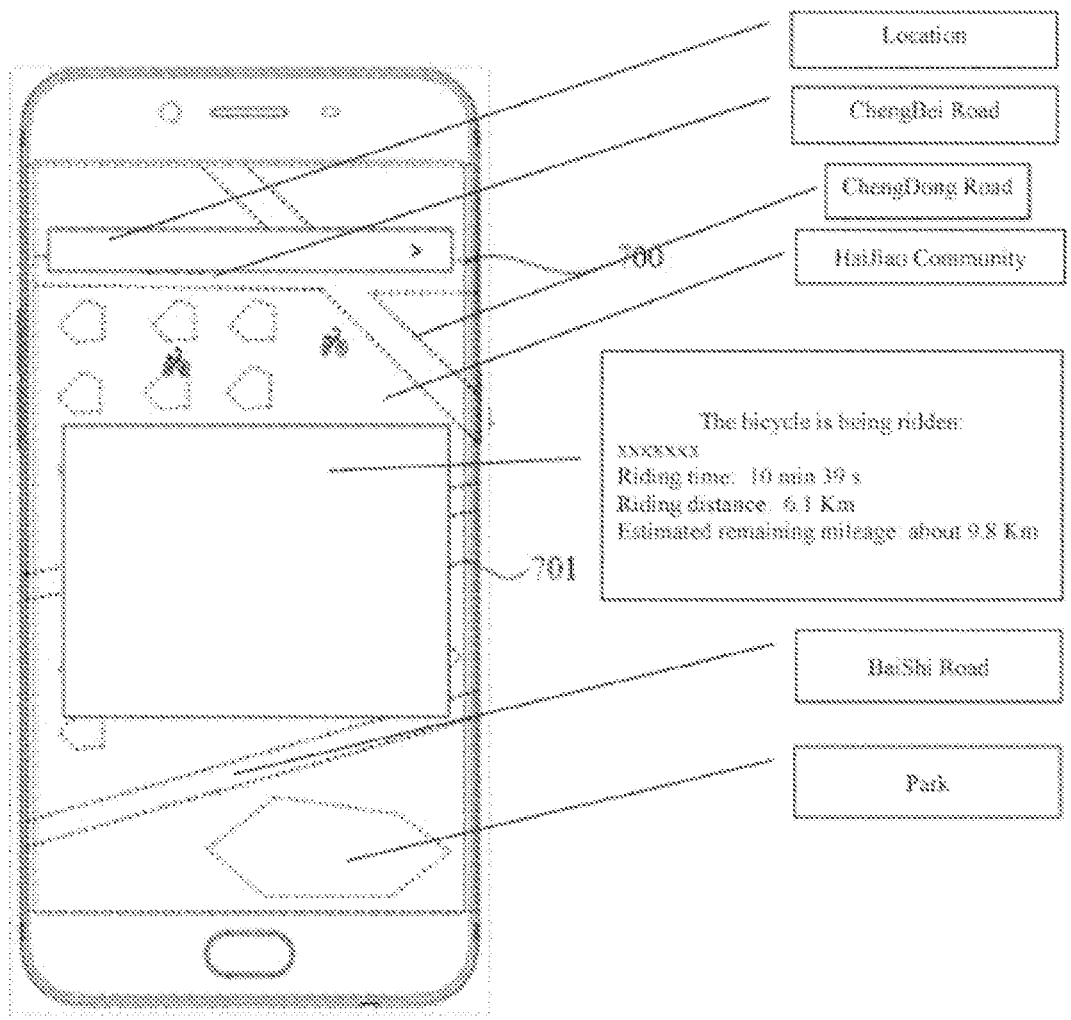
FIG. 7 is a schematic diagram of a third prompt message according to an embodiment of the disclosure.

In an embodiment of the present disclosure, the third bicycle data of the target bicycle is sent to the user terminal. The user terminal displays the third prompt information according to the third bicycle data. The third prompt information includes at least one of the mileage and time parameters of the target bicycle which are used to prompt the user about the bicycle's battery life during the course of riding. FIG. 7 is a schematic diagram of a third prompt message in an embodiment of the present disclosure. FIG. 7 shows a bicycle appointment page 700 and third prompt information 701. After sending the third bicycle data of the target bicycle to the user terminal according to the current power information, the user terminal may display the third prompt information according to the third bicycle data. The third prompt information may include the number of bicycle in riding or the identification information of the bicycle in riding, and the distance the bicycle was ridden and the time the bicycle was ridden. The content of the third prompt information may also include the time that the bicycle continues to be ridden or mileage that the bicycle continues to be ridden.

In the embodiment of the present disclosure, when the target bicycle is in a riding state, the current power information of the target bicycle is obtained, and the third bicycle data of the target bicycle is sent to the user terminal according to the current power information, so that the user terminal displays a third prompt information based on the third bicycle data. The embodiment of the present disclosure can realize the real-time prompting the user of the bicycle's battery life during the course of riding.

Figure 8:
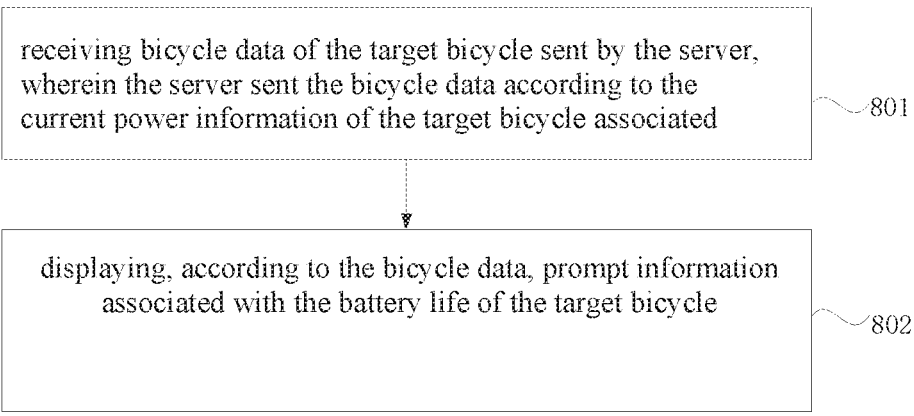
FIG. 8 is a schematic flowchart of a bicycle information prompting method according to an embodiment of the present disclosure.

FIG. 8 is a schematic flowchart of a bicycle information prompting method provided by an embodiment of the present disclosure. The method applies to a user terminal. The method may be performed by a bicycle information prompting device, and the device may be implemented by at least one of software and hardware. As shown in FIG. 8, the bicycle information prompting method may include the following:

Step 801: Receiving bicycle data of the target bicycle sent by the server, wherein the server sent the bicycle data according to the current power information of the target bicycle associated with the user terminal.

Step 802: Displaying, according to the bicycle data, prompt information associated with the battery life of the target bicycle.

The bicycle data is data information associated with current power information of the target bicycle.

In an embodiment of the present disclosure, the user terminal may be a device that is associated with the target bicycle, and the user may view related information of the target bicycle through the user terminal. For example, the user terminal may be a mobile phone, a tablet computer, or the like, and the user may view the target bicycle in the user client of the user terminal. The bicycle data may be data that has a corresponding relationship with the prompt information associated with the target bicycle life. The content of the prompt information associated with the target bicycle life can be obtained through converting, corresponding, and calculating the bicycle data. That is, after obtaining the target bicycle data, the user terminal may perform calculations in a certain manner to determine the content of the prompt information associated with the target bicycle battery life. The target bicycle life may include mileage concerning how far the target bicycle can continue to ride and time parameters concerning how long the target bicycle can continue to ride.

In the embodiment of the present disclosure, by receiving the bicycle data of the target bicycle associated with the user terminal sent by the server, the prompt information associated with the battery life of the target bicycle is displayed according to the bicycle data. The embodiment of the present disclosure can solve the problem that the user does not know the power information of the target bicycle in advance, which may cause the user to run out of battery power during the course of riding, thereby causing the user to end the ride. The solution provided by the present disclosure improves the user experience.

Figure 9:
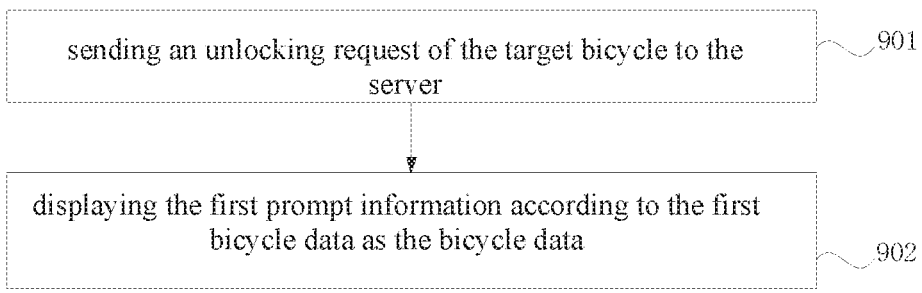
FIG. 9 is a schematic flowchart of a bicycle information prompting method provided by another embodiment of the present disclosure.

FIG. 9 is a schematic flowchart of a bicycle information prompting method provided by an embodiment of the disclosure. The method is applied to a user terminal. The method may be performed by a bicycle information prompting device, and the device may be implemented by at least one of software and hardware. As shown in FIG. 9, the bicycle information prompting method may include the following:

Step 901: Sending an unlocking request of the target bicycle to the server.

In one embodiment of the present disclosure, the user can unlock the target bicycle through the user client on the user terminal. After scanning the QR code of the target bicycle through the client on the user terminal or manually entering the bicycle number of the target bicycle directly on the client, an unlocking request is generated for the target bicycle, and the unlocking request is sent to the server. The unlocking request carries identification information of the target bicycle. The identification information is used by the server to obtain the current power information of the target bicycle according to the unlocking request.

Step 902: Displaying the first prompt information according to the first bicycle data as the bicycle data.

The first bicycle data of the target bicycle is data determined by the server based on the current power information when the current power information of the target bicycle meets a preset first power condition. The first prompt information includes the battery life of the target bicycle, and information for user feedback. The information for user feedback includes at least one of the following: continuing riding the bicycle and cancelling riding the bicycle.

In an embodiment of the present disclosure, the first prompt information may include information for a user to feedback to continue riding the bicycle or cancel riding the bicycle. The first prompt information includes information for user feedback, and the information for user feedback includes at least one of the following: continue to ride the bicycle and cancelling riding the bicycle. For example, the information may be used to prompt the user to choose to continue riding the target bicycle or to cancel riding the target bicycle. Through the user terminal, the user may select "Continue to ride the target bicycle" or "Cancel to ride the target bicycle" in the first prompt information to provide feedback, and send the feedback to the first prompt information to the server. In addition, the first prompt information may further include information of a mileage that the target bicycle can continue to be ridden or a time parameter that the target bicycle can continue to be ridden. In one embodiment of the present disclosure, the first prompt information, the first bicycle data, and the preset first power condition may refer to the related explanations in the foregoing embodiments, and the details are not described again herein.

Optionally, according to the identification information of the target bicycle carried in the unlocking request, the power information in the message information of the neighboring time or the current time sent by the target bicycle according to the preset time is obtained. The obtained power information in the message information is as the current power information.

Optionally, according to the identification information of the target bicycle carried in the unlock requesting, a power query information is sent to the target bicycle to query the current power information of the target bicycle and the current power information of the target bicycle, which is sent by the target bicycle according to the power query information, is received. The received power information is the current battery information of the target bicycle.

Optionally, when the feedback of the first prompt information sent by the user to the server is a request to cancel to ride the bicycle, the method further includes the following:

The second bicycle data of the target bicycle, which is sent by the server according to the feedback, is received. The second prompt information is displayed according to the second bicycle data of the target bicycle. The second prompt information may include at least one of the following: information prompting the user to select a candidate bicycle, information about position parameters of candidate bicycle, and cancelling to ride the bicycle. The candidate bicycles are bicycles that are located in a preset area of the geographical location of the target bicycle and that satisfy the preset third power condition.

Optionally, the bicycle information prompting method may further include the following:

After displaying the first prompt information according to the first bicycle data as the bicycle data, the user's feedback on the first prompt information is sent to the server, so that the server determines whether to send the unlocking instruction to the target bicycle according to the feedback.

In an embodiment of the present disclosure, when the feedback is a request to continue riding the bicycle, an unlocking instruction is sent to the target bicycle to unlock the target bicycle or, when the feedback is a request to cancel riding of the bicycle, no unlocking instruction is sent to the target bicycle or, when the determination result is that the feedback on the first prompt information sent by the user terminal is not received within a preset time interval, no unlocking instruction is sent to the target bicycle.

In an embodiment of the present disclosure, when the user's feedback of the first prompt message is a request to continue riding the bicycle, the information of "request to continue riding the bicycle" may be sent to the server, so that the server sends an unlocking instruction to the target bicycle to unlock the target bicycle or, when the user's feedback of the first prompt message is the request to cancel riding the bicycle, a request of "Cancel to ride the bicycle" is sent to the server, so that the server does not send any unlocking instructions to the target bicycle. When the user does not send the user's feedback of the first prompt information to the server through the user terminal, the server cannot learn any feedback result and does not send an unlocking instruction to the target bicycle.

Optionally, the bicycle information prompting method may further include the following:

While receiving the first bicycle data of the target bicycle sent by the server and displaying the first prompt information according to the first bicycle data, the user terminal receives the unlocking instruction of the target bicycle sent by the server and then receives user feedback of the first prompt information triggered by the user. As a result, it is determined whether to send the unlocking instruction to the target bicycle through the Bluetooth communication protocol according to the feedback.

In an embodiment of the present disclosure, while receiving the first bicycle data of the target bicycle sent by the server and displaying the first prompt information according to the first bicycle data, the user can simultaneously obtain the unlocking key of the target bicycle sent by the server and then unlock the target bicycle via Bluetooth. Optionally, when the user's feedback of the first prompt information triggered by the user is a request to continue riding the bicycle, the unlocking instruction received from the server is directly sent to the target bicycle for unlocking the bicycle via Bluetooth.

In an embodiment of the present disclosure, because the bicycle information prompting method applied to the server and the bicycle information prompting method applied to the user terminal can interact between the user terminal, the server, and the target bicycle during execution, the same or similar technical features may be used in the interaction process. For example, the first prompt information, the second prompt information, the third prompt information, the preset first power condition, the preset second power condition, the preset third power condition, the first bicycle data, the first, the second bicycle data, and the third bicycle data are discussed in the explanations in the previous embodiments and will not be described one by one in this embodiment.

In the embodiment of the present disclosure, by sending an unlocking request of the target bicycle to the server, the first prompt information is displayed according to the first bicycle data as the bicycle data. The first bicycle data of the target bicycle is data the server determines based on the current power information when the current power information of the target bicycle meets the first power conditions. The first prompt information includes the battery life of the target bicycle, and information for the user to feedback, wherein the feedback includes at least one of the continued to ride the bicycle and cancel to ride the bicycle. The embodiment of the present invention can solve the problem that the user cannot understand the battery life of the target bicycle when the bicycle is unlocked, which may cause the user to have to end the ride due to the battery life during the course of riding. The battery life can be prompted when the bicycle is unlocked, so that the user can decide whether to perform a subsequent unlocking operation on the target bicycle according to the first prompt information.

Figure 10:
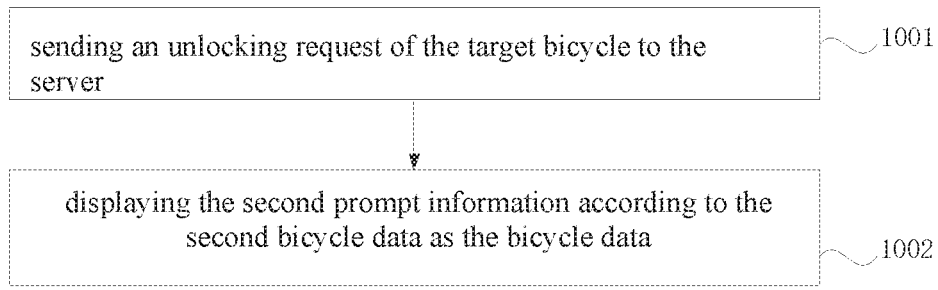
FIG. 10 is a schematic flowchart of a bicycle information prompting method according to another embodiment of the present disclosure.

FIG. 10 is a schematic flowchart of a bicycle information prompting method provided by an embodiment of the present disclosure and the method applies to a user terminal. As shown in FIG. 10, the bicycle information prompting method may include the following:

Step 1001: Sending an unlocking request of the target bicycle to the server.

Step 1002: Displaying the second prompt information according to the second bicycle data as the bicycle data.

The second bicycle data of the target bicycle is data determined by the server based on the current power information when the current power information of the target bicycle meets a preset second power condition. The second prompt information includes at least one of the following: information prompting the user to select a candidate bicycle, information of position parameter of the candidate bicycle, and the cancelling to ride the bicycle. The candidate bicycle is a bicycle that is located in a preset area where the target bicycle is located and meets the preset third power condition.

In an embodiment of the present disclosure, the preset second power condition may be a preset second power range and, when the current power of the target bicycle is within the preset second power range, it is determined that the current power information of the target bicycle meets the preset second power condition. When the current power of the target bicycle is not within the preset second power range, it is determined that the current power information of the target bicycle does not satisfy the second power condition. For example, the preset second power range is less than 1% of the total power of the bicycle. When the current power of the bicycle is greater than 1% of the total power of the bicycle, the current power information of the target bicycle is considered not to satisfy the second power condition. When the acquired current power of the target bicycle is less than 1% of the total power of the target bicycle, it is considered that the current power information of the target bicycle meets the preset second power condition.

In an embodiment of the present disclosure, because the bicycle information prompting method applied to the server and the bicycle information prompting method applied to the user terminal can interact between the user terminal, the server, and the target bicycle during execution, the same or similar technical features may be used in the interaction process. For example, the first prompt information, the second prompt information, the third prompt information, the preset first power condition, the preset second power condition, the preset third power condition, the first bicycle data, the second bicycle data, and the third bicycle data are discussed in the previous embodiments, and will not be described one by one in this embodiment. In addition, the preset first power condition, the preset second power condition, and the preset third power condition may be an actual power range value, and not just a percentage range.

The solution provided by the embodiment of the present disclosure sends an unlocking request of the target bicycle to the server, and displays the second prompt information according to the second bicycle data as the bicycle data. The solution provided by the embodiment of the present invention can solve the problem that the user does not know the battery life of the target bicycle when unlocking the bicycle, which may cause the user to have to end the ride due to the battery life during the course of riding, The solution provided by the embodiment of the present invention can prompt the user regarding the battery life of the bicycle when the bicycle is unlocked so that the user can decide whether to ride the candidate bicycle according to the second prompt information.

Figure 11:
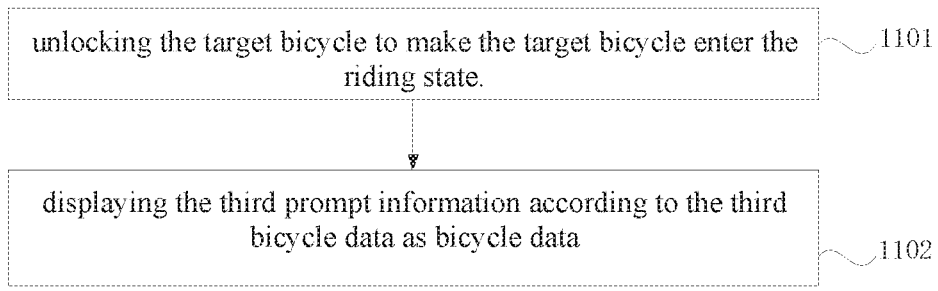
FIG. 11 is a schematic flowchart of a bicycle information prompting method according to another embodiment of the present disclosure.

FIG. 11 is a schematic flowchart of a method for prompting bicycle information according to an embodiment of the present disclosure, which is applied to a user terminal. As shown in FIG, the method may include the following:

Step 1101: Unlocking the target bicycle to make the target bicycle enter the riding state.

Step 1102: Displaying the third prompt information according to the third bicycle data as bicycle data.

The third bicycle data is data determined by the server according to the acquired current power information of the target bicycle. The third prompt information includes at least one of the following: the mileage of the target bicycle and time parameters of the target bicycle.

In an embodiment of the present disclosure, the user can display the third prompt information in real time during the course of riding. The third prompt information may include at least one of the following: the mileage of the target bicycle and time parameters of the target bicycle to remind the user about mileage of the bicycle. Referring to FIG. 7, the third prompt information is displayed on the user terminal. The displayed content includes the number of the bicycle in use or the bicycle identification information, as well as the distance the bicycle has been ridden and time the bicycle has been ridden. The displayed content also includes the time or mileage that the bicycle can continue to be ridden.

In an embodiment of the present disclosure, because the bicycle information prompting method applied to the server and the bicycle information prompting method applied to the user terminal can interact between the user terminal, the server, and the target bicycle during execution, the same or similar technical features may be used in the interaction process. For example, the third prompt information, the preset third power condition, and the third bicycle data, etc., can be as discussed in the explanation in the previous embodiments. Accordingly, no specific description thereof will be given in this embodiment. In addition, the preset third power condition may be an actual power range value, not just a percentage range.

In the embodiment of the present disclosure, the target bicycle is unlocked so that the target bicycle enters the riding state. The third prompt information is displayed according to the third bicycle data as the bicycle data so that the user terminal displays the third prompt information according to the third bicycle data. The embodiment of the present disclosure can realize the real-time reminding of the bicycle's battery life during the course of riding.

Figure 12:
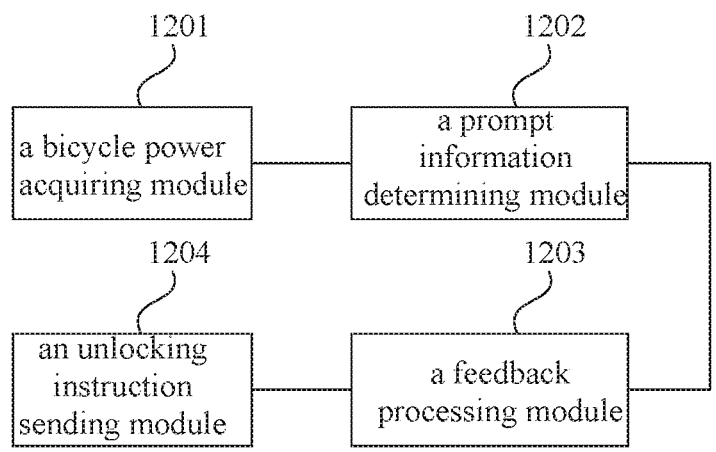
FIG. 12 is a schematic structural diagram of a bicycle information prompting device provided by an embodiment of the present disclosure.

FIG. 12 is a schematic structural diagram of a bicycle information prompting device according to an embodiment of the present disclosure. The bicycle information prompting device of this embodiment is configured on a server. As shown in FIG. 12, the bicycle information prompting device may include a bicycle power acquiring module 1201 and a prompt information determining module 1202.

The bicycle power acquiring module 1201 is configured to acquire the current power information of the target bicycle.

The prompt information determining module 1202 is configured to send the bicycle data of the target bicycle to the user terminal associated with the target bicycle according to the current power information, so that the user terminal displays the prompt information associated with the battery life of the target bicycle. The bicycle data is data information associated with the current power information of the target bicycle.

Optionally, the bicycle power acquisition module 1201 includes the following:

When receiving the unlocking request of the target bicycle sent by the user terminal, the server obtains the current power information of the target bicycle.

The prompt information determining module 1202 may include the following:

When the current power information meets the preset first power condition, the first bicycle data of the target bicycle is sent to the user terminal according to the current power information, so that the user terminal displays the first prompt according to the first bicycle data information. The first prompt information includes the battery life of the target bicycle and information for user feedback. The information for user feedback includes at least one of the following: continue to riding the bicycle and cancelling riding the bicycle.

When the current power information meets the preset second power condition, the second bicycle data of the target bicycle is sent to the user terminal according to the current power information, so that the user terminal displays the second prompt information according to the second bicycle data. The second prompt information includes at least one of the following: information prompting the user to select a candidate bicycle to ride, information of position parameters of the candidate bicycle, and cancelling riding the bicycle. The candidate bicycle is located in the geographic location of the target bicycle in the preset area of the location and satisfies the preset third power condition.

Optionally, the bicycle power acquisition module 1201 includes the following:

When the target bicycle is in a riding state, the current power information of the target bicycle is obtained.

The prompt information determining module 1202 may include the following:

The third bicycle data of the target bicycle is sent to the user terminal according to the current power information, so that the user terminal displays third prompt information according to the third bicycle data. The third prompt information includes at least one of the following: the mileage of the target bicycle and time parameters of the target bicycle.

Optionally, the device may further include the following:

The feedback processing module 1203 is configured to receive the feedback of the first prompt information sent by the user terminal and determine whether to send an unlocking instruction to the target bicycle according to the feedback, or it is configured to receive the feedback, and determine whether to send an unlocking instruction to the target bicycle according to the determined result.

Optionally, when the feedback is a request to continue to ride the bicycle, an unlocking instruction is sent to the target bicycle to unlock the target bicycle.; or When the feedback a request to cancel to ride the bicycle, no unlocking instruction is sent to the target bicycle; or When the feedback is a request to cancel riding the bicycle, the second bicycle data of the target bicycle is sent to the user terminal according to the feedback, so that the user terminal displays the second prompt according to the second bicycle data Information. The second prompt information is information for prompting the user to have other candidate bicycles in the preset area of the target bicycle geographic location; or When the determining result is that no feedback for the first prompt information sent by the user terminal is received within a preset time interval, no unlocking instruction is sent to the target bicycle.

Optionally, the device may further include the following:

The unlocking instruction sending module 1204 is configured to send the first bicycle data of the target bicycle to the user terminal, so that the user terminal displays the first prompt information according to the first bicycle data, and at the same time, the unlocking the instruction of the target bicycle is sent to the user terminal, so that after determining that the user feedback is to continue to ride the bicycle, the user terminal directly sends the unlocking instruction to the target bicycle through the Bluetooth communication protocol of the user terminal to unlock the bicycle.

Optionally, the bicycle power acquiring module 1201 is configured to obtain the power information in the message information of the neighboring time or the current time sent by the target bicycle at a preset time as the current power information.

The bicycle information prompting device configured on the server provided by the embodiment of the present disclosure can execute the bicycle information prompting method applied to the server according to any embodiment of the present disclosure, and has the corresponding function modules and beneficial effects of the execution method.

Figure 13:
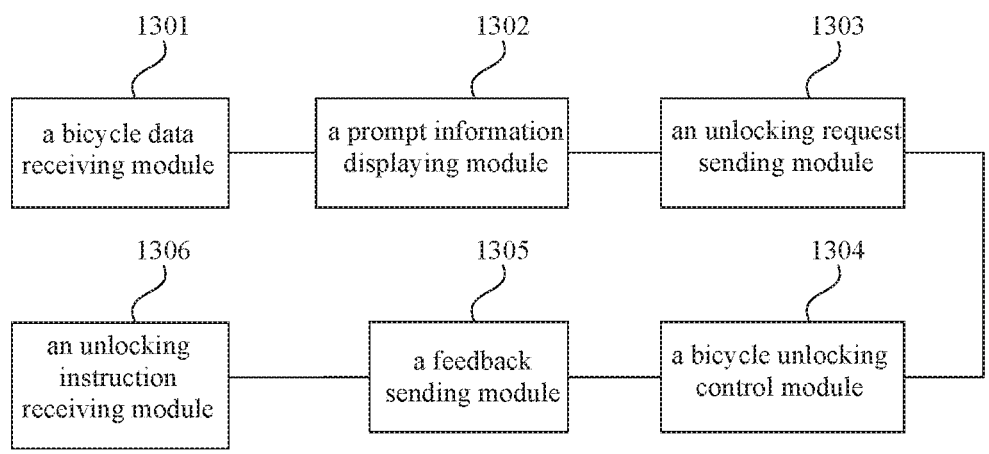
FIG. 13 is a schematic structural diagram of a bicycle information prompting device provided by an embodiment of the present disclosure.

FIG. 13 is a structural diagram of an information prompt device provided by an embodiment of the present disclosure. The bicycle information prompt device of the present embodiment is configured at a user terminal. As shown in FIG. 13, the bicycle information prompt device can include: \ a bicycle data receiving module 1301 and a prompt information display module 1302.

The bicycle data receiving module 1301 is configured to receive the bicycle data of the target bicycle sent by the server according to the current power information of the target bicycle associated with the user terminal.

The prompt information display module 1302 is configured to display the prompt information associated with the battery life of the target bicycle according to the bicycle data, wherein the bicycle data is data information associated with the current power information of the target bicycle.

Optionally, the device may also include the following:

The unlocking request sending module 1303 is configured to send the unlocking request of the target bicycle to the server.

The prompt information display module 1302 may include the following:

The first prompt information is displayed according to the first bicycle data as the bicycle data. The first bicycle data of the target bicycle is data determined by the server according to the current power information when the current power information of the target bicycle meets the preset first power condition. The first prompt information includes the battery life of the target bicycle and the user feedback information. The user feedback information includes at least one of the following: continue riding the bicycle and cancel to ride the bicycle.

The second prompt information is displayed according to the second bicycle data as the bicycle data. The second bicycle data of the target bicycle is data determined by the server according to the current power information when the current power information of the target bicycle meets the preset second power condition. The second prompt information includes at least one of the following: information of prompting the user to select a candidate bicycle, information of the location parameters of the candidate bicycle, and the cancelling riding the bicycle, wherein the candidate bicycle is the bicycle located in the preset area of the geographical location of the target bicycle and the bicycle meets the preset third power condition.

Optionally, when the feedback is a request to continue riding the bicycle, the unlocking instruction is sent to the target bicycle to unlock the target bicycle. When the feedback is a request to cancel riding the bicycle, no unlocking instruction is sent to the target bicycle. When the determining result is that no feedback of the first prompt information sent by the user terminal is received at the preset time interval, no unlocking instruction is sent to the target bicycle. At the same time as receiving the first bicycle data of the target bicycle sent by the server and displaying the first prompt information according to the first bicycle data, the unlocking instruction of the target bicycle sent by the server and the feedback of the first prompt information triggered by the user is received, and whether to send the unlocking instruction to the target bicycle through Bluetooth communication protocol according to the feedback result is determined.

Optionally, the device may also include the following:

The bicycle unlocking control module 1304 is configured to unlock the target bicycle to enable the target bicycle to enter the riding state.

The prompt information display module 1302 may include the following:

The third prompt information is displayed according to the third bicycle data as the bicycle data. The third bicycle data is data determined by the server according to the obtained current power information of the target bicycle. The third prompt information includes at least one of the following: the mileage of the target bicycle and time parameters of the target bicycle.

Optional, the device may also include the following:

The feedback sending module 1305 is configured to send the user feedback of the first prompt information to the server after displaying the first prompt information according to the first bicycle data as the bicycle data, so that the server may determine whether to send the unlocking instruction to the target bicycle according to the feedback; or An unlocking instruction receiving module 1306 is configured to receive the unlocking instruction of the target bicycle sent by the server while receiving the first bicycle data sent by the server and displaying the first prompt information according to the first bicycle data, and then receive the feedback of the user triggered by the user on the first prompt information and determine whether to send the unlocking instruction to the target bicycle through the Bluetooth communication protocol according to the user feedback.

The bicycle information prompt device configured for the user terminal provided by the embodiment of the present disclosure can execute the bicycle information prompt method applied to the user terminal provided by any embodiment of the present disclosure, and has the corresponding function modules and beneficial effects of the execution method.

The embodiment of the present disclosure provides a server, which is represented in the form of a general computing device. The components of the server may include, but are not limited to, one or more processors, system memory, and buses connecting different system components, including system memory and processors.

The system memory is configured to store the executable program code.

The processor runs the computer program corresponding to the executable program code by reading the executable program code stored in the system memory, for example, the bicycle information prompt method applied to the server provided by the embodiment of the present disclosure, including the following:

Obtaining the current power information of the target bicycle.

According to the current power information, sending the bicycle data of the target bicycle to the user terminal associated with the target bicycle, so that the user terminal displays the prompt information associated with the battery life of the target bicycle.

Figure 14:
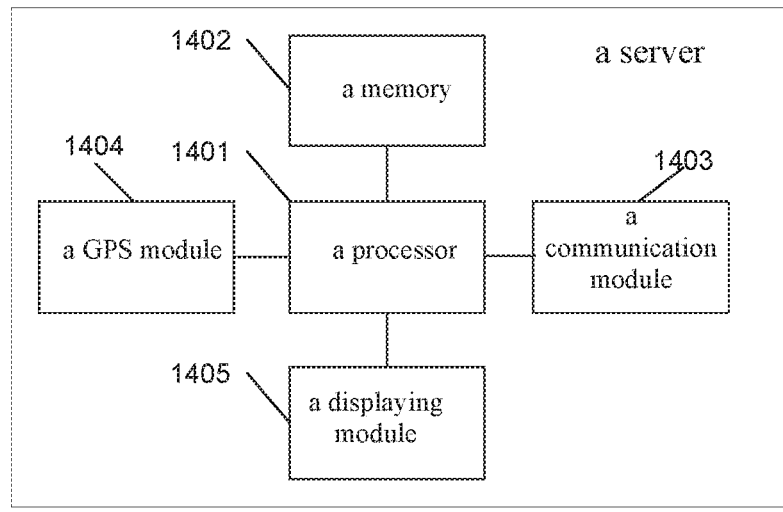
FIG. 14 is a schematic structural diagram of a server according to an embodiment of the present disclosure.

FIG. 14 is a hardware structure diagram of a server provided by an embodiment of the present disclosure, which may include a processor 1401 and a memory 1402, a communication module 1403, a GPS module 1404 and a displaying module 1405. Among them, the communication module 1403 may be configured for information transmission, and the processor 1401 may call the logic instructions in the memory 1402 to execute the bicycle information prompt method of the above embodiments. The communication module 1403 may be any one of a Wi-Fi module, a Zifeng ZigBee module, a mobile communication module, a network module, and a wired module.

In addition, the logic instructions in the memory 1402 may be realized in the form of a software functional unit and may be stored in a computer readable storage medium when sold or used as an independent product. Based on such understanding, the technical solution of the present disclosure may be embodied in the form of a software product, which is stored in a storage medium, including a number of instructions to enable a computer device (which may be a personal computer, a server, or a network device, etc.) to perform all or part of the steps of the method described in any embodiment of the present disclosure. The aforementioned storage medium may be non-transient storage medium, including: a U-disk, a mobile hard disk, a read-only memory, a random access memory, a disk or an optical disk, which can store program code, or transient storage medium.

The service terminal provided by the embodiment of the present disclosure can make the user terminal display the prompt information associated with the battery life (i.e. power) of the target bicycle. The embodiment of the invention can solve the problem that the user is unable to know the battery information of the target bicycle in advance, which may cause the bicycle to lack the power of the bicycle during the course of riding, so that the user has to end the riding. The solution provided by the embodiment improves the user experience.

The embodiment of the present disclosure also provides a user terminal, which includes: one or more processors, and a storage device for storing one or more programs, when the one or more programs are executed by the one or more processors, so that the one or more processors execute the bicycle information prompt method applied to the user terminal provided by the embodiment of the present disclosure. The method includes the following:

Receiving the bicycle data of the target bicycle associated with the user terminal sent by the server; and Displaying the prompt information associated with the battery life of the target bicycle according to the bicycle data.

Figure 15:
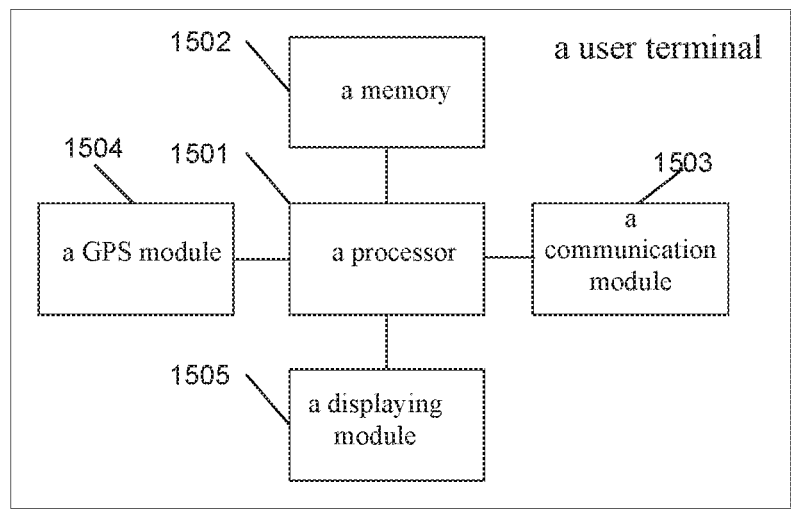
FIG. 15 is a schematic structural diagram of a user terminal according to an embodiment of the present disclosure.

FIG. 15 is a hardware structure diagram of a user terminal provided in an embodiment, which may include a processor 1501, a memory 1502, a communication module 1503, a GPS module 1504, and a displaying module 1505. The communication module 1503 may be used for information transmission. The processor 1501 may call the logic instruction in the memory 1502 to execute the bicycle information prompt method of the above embodiments. The short-distance communication module 1503 may be any one of a Bluetooth module, a Wi-Fi module, a Zifeng ZigBee, a mobile communication module, a network module, and a wired module.

In addition, the logic instructions in the memory 1502 may be executed in the form of a software functional unit and may be stored in a computer readable storage medium when sold or used as an independent product. Based on such understanding, the technical solution of the disclosure may be embodied in the form of a software product, which is stored in a storage medium, including a number of instructions to enable a computer device (which may be a personal computer, a server, or a network device, etc.) to perform all or part of the steps of the method described in each embodiment of the disclosure. The aforementioned storage medium may be non-transient storage medium, including: a U-disk, a mobile hard disk, a read-only memory, a random access memory, a disk or an optical disk, which may store program code, or transient storage medium.

The user terminal provided by the embodiment of the present disclosure receives the bicycle data of the target bicycle associated with the user terminal sent by the server, displays the prompt information associated with the battery life of the target bicycle according to the bicycle data, and solves the problem that the user does not know the battery information of the target bicycle in advance, which may cause the user to have to close down due to the lack of power of the bicycle during the course of riding. The solution provided by the embodiment has improved the user's driving experience.

The embodiment provides a storage medium containing computer executable instructions which are configured to execute a bicycle information prompt method applied to the server when executed by a computer processor. The method includes the following:

Obtaining the current power information of the target bicycle; and

According to the current electricity information, sending the bicycle data of the target bicycle to the user terminal associated with the target bicycle, so that the user terminal displays the prompt information associated with the battery life of the target bicycle.

Optionally, the computer executable instruction may also be configured to execute a bicycle information prompt method applied to the server provided by any embodiment of the present disclosure when it is executed by a computer processor.

The embodiment also provides a storage medium including a computer executable instruction configured to execute a bicycle information prompt method applied to a user terminal when executed by a computer processor. The method includes the following:

Receiving the bicycle data of the target bicycle associated with the user terminal sent by the server; and Displaying the prompt information associated with the battery life of the target bicycle according to the bicycle data.

Optionally, the computer executable instruction may also be configured to execute the technical scheme of a bicycle information prompt method applied to the user terminal provided by any embodiment of the present disclosure when it is executed by the computer processor.

The embodiment of the present disclosure may solve the problem that the user is unable to know the battery information of the target bicycle in advance, which may cause the bicycle to lack power during the course of riding, so that the user has to end the riding. The solution provided by the embodiment improves the user's driving experience Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A bicycle information prompting method applied to a server, comprising:
   obtaining current power information of a target bicycle;
   sending bicycle data of the target bicycle to a user terminal associated with the target bicycle according to the current power information, wherein the bicycle data is data information associated with the current power information of the target bicycle; and
   displaying, at the user terminal prompt information comprising said data information associated with a battery life of the target bicycle,
   wherein obtaining the current power information of the target bicycle comprises;
      when receiving an unlocking request of the target bicycle sent by the user terminal, obtaining the current power information of the target bicycle;
      sending the bicycle data of the target bicycle to the user terminal associated with the target bicycle according to the current power information; and
      the user terminal displaying prompt information associated with the battery life of the target bicycle, comprising:
         when the current power information meets a preset first power condition, sending a first bicycle data of the target bicycle to the user terminal according to the current power information, wherein the user terminal displays a first prompt according to the first bicycle data;

when the current power information meets a preset second power condition, sending a second bicycle data of the target bicycle to the user terminal according to the current power information, wherein the user terminal displays a second prompt according to the second bicycle data;

while sending the first bicycle data of the target bicycle to the user terminal, wherein the user terminal displays first prompt information according to the first bicycle data, sending an unlocking instruction of the target bicycle to the user terminal;

receiving feedback of the first prompt information sent by the user terminal; and wherein after determining that user feedback is to continue riding the target bicycle, the user terminal sends the unlocking instruction directly to the target bicycle through a wireless communication protocol of the user terminal to unlock the target bicycle.

2. The method according to claim 1, wherein obtaining the current power information of the target bicycle further comprises:

when the target bicycle is in a riding state, obtaining the current power information of the target bicycle;

sending the bicycle data of the target bicycle to the user terminal associated with the target bicycle according to the current power information; and the user terminal displaying the prompt information associated with the battery life of the target bicycle, comprising:

sending third bicycle data of the target bicycle to the user terminal according to the current power information, wherein the user terminal displays a third prompt information according to the third bicycle data.

3. The method according to claim 1 further comprising:

after sending the first bicycle data of the target bicycle to the user terminal according to the current power information:

determining whether to send an unlocking instruction to the target bicycle according to the feedback or whether the feedback is received; and determining whether to send the unlocking instruction to the target bicycle according to a determination result.

4. The method according to claim 3, wherein determining whether to send an unlocking instruction to the target bicycle according to the feedback or the determining result comprises any of:

when the feedback is a request to continue riding the target bicycle, sending the unlocking instruction to the target bicycle to unlock the target bicycle;

when the feedback result is a request to cancel riding the target bicycle, not sending an unlock instruction to the target bicycle;

when the feedback is a request to cancel riding the target bicycle, sending the second bicycle data of the target bicycle to the user terminal according to the feedback, wherein the user terminal displays the second prompt information; and when the determining result is that no feedback for the first prompt information sent by the user terminal is received within a preset time period, not sending an unlocking instruction to the target bicycle.

5. The method according to claim 1, wherein the obtaining the current power information of the target bicycle comprises:

obtaining battery information in a message information of a neighboring time or a current time sent as the current power Information by the target bicycle at a preset time.

6. A bicycle information prompting method applied to a user terminal, comprising:

receiving a bicycle data of a target bicycle according to a current power information of the target bicycle associated with a user terminal, wherein the bicycle data is data information associated with the current power information of the target bicycle;

displaying a prompt information comprising data information associated with a battery life of the target bicycle according to the bicycle data;

before receiving the bicycle data of the target bicycle sent by a server according to the current power information of the target bicycle associated with the user terminal:

sending an unlocking request of the target bicycle to the server; and displaying of the prompt information comprising data information associated with the battery life of the target bicycle according to the bicycle data comprising:

displaying first prompt information according to a first bicycle data as bicycle data, wherein the first bicycle data of the target bicycle comprises data determined by the server according to the current power information when power condition; or displaying a second prompt information according to a second bicycle data as bicycle data, wherein the second bicycle data of the target bicycle comprises data determined by the server according to the current power information when the current power information of the target bicycle to meet a preset second power condition;

after displaying the first prompt information according to the first bicycle data as the bicycle data, sending user feedback to the first prompt information to the server;

the server determining whether to send an unlocking instruction to the target bicycle according to the feedback;

when receiving the first bicycle data of the target bicycle sent by the server and displaying the first prompt information according to the first bicycle data, receiving the unlocking instruction of the target bicycle sent by the server;

receiving user feedback triggered by the user on the first prompt information; and determining whether to send the unlocking instruction to the target bicycle through a wireless communication protocol according to the feedback.

7. The method according to claim 6, comprising:

before receiving the bicycle data of the target bicycle sent by the server according to the current power information of the target bicycle associated with the user terminal;

unlocking the target bicycle to make the target bicycle enter a riding state; and displaying the prompt information associated with the battery life of the target bicycle according to the bicycle data comprising:

displaying third prompt information according to third bicycle data as bicycle data; and wherein the third bicycle data comprises data determined by the server according to the obtained current power information of the target bicycle.

8. A bicycle information prompting device applied to a server, comprising:
a bicycle power acquiring module configured to obtain current power information of a target bicycle;
a prompt information determination module configured to send bicycle data of the target bicycle to a user terminal associated with the target bicycle according to the current power information, wherein the bicycle data is data information associated with the current power information of the target bicycle;
the user terminal displaying prompt information associated with a battery life of the target bicycle;
the bicycle power acquiring module configured to:
when receiving an unlocking request of the target bicycle sent by the user terminal, obtain the current power information of the target bicycle;
the prompt information determination module configured to:
when the current power information meets a preset first power condition, send a first bicycle data of the target bicycle to the user terminal according to the current power information, wherein the user terminal displays first prompt information according to the first bicycle data; and
when the current power information meets a preset second power condition, send second bicycle data of the target bicycle to the user terminal according to the current power information, wherein the user terminal displays a second prompt information according to the second bicycle data following; and
an unlocking instruction sending module configured to send the first bicycle data of the information according to the first bicycle data and, at the same time, send the unlocking instruction of the target bicycle to the user terminal, wherein after determining that user feedback of continuing to ride the bicycle, the user terminal directly sends the unlocking instruction to the target bicycle through a wireless communication protocol of the user terminal for unlocking the target bicycle.

9. The device according to claim 8, further comprising:
the bicycle power acquiring module configured to:
when the target bicycle is in a riding state, obtain the current power information of the target bicycle;
the prompt information determination module configured to:
send third bicycle data of the target bicycle to the user terminal according to the current power information, wherein the user terminal displays third prompt information according to the third bicycle data.

10. The device according to claim 8, further comprising:
a feedback result processing module configured to receive the feedback of the first prompt information sent by the user terminal, and determine any of:
whether to send an unlocking instruction to the target bicycle according to the feedback;
determine whether feedback has been received; and
determine whether to send an unlocking instruction to the target bicycle according to a determining result.

11. A bicycle information prompting device applied to a user terminal, comprising:
a bicycle data receiving module configured to receive bicycle data of a target bicycle sent by a server according to current power information of the target bicycle associated with the user terminal wherein the bicycle data is data information associated with the current power information of the target bicycle; and
a prompt information displaying module configured to display prompt information comprising data information associated with battery life of the target bicycle according to the bicycle data;
an unlock request sending module configured to send an unlocking request of the
a feedback sending module configured to send user feedback to the server;
the unlock request sending module further configured to:
before receiving the bicycle data of the target bicycle sent by the server according to the current power information of the target bicycle associated with the user terminal, send and unlocking request of the target bicycle to the server;
the prompt information displaying module further configured to:
after the unlock request sending module sends the unlocking request of the target bicycle to the server, display the prompt information comprising data information associated with the battery life of the target bicycle according to the bicycle data comprising:
displaying first prompt information according to a first bicycle data as bicycle data, wherein the first bicycle data of the target bicycle comprises data determined by the server according to the current power information when the current power information of the target bicycle to meet a preset first power condition; or
displaying a second prompt information according to a second bicycle data as bicycle data, wherein the second bicycle data of the target bicycle comprises data determined by the server according to the current power information when the current power information of the target bicycle to meet a preset second power condition;
the feedback sending module further configured to:
after the prompt information displaying module displays the first prompt information according to the first bicycle data as the bicycle data, send user feedback to the first prompt information to the server;
the bicycle data receiving module further configured to:
when receiving the first bicycle data of the target bicycle sent by the server and the prompt information displaying module displaying the first prompt information according to the first bicycle data, receive the unlocking instruction of the target bicycle sent by the server;
the feedback sending module further configured to:
receive user feedback triggered by the user on the first prompt information;
the unlock request sending module further configured to:
determine whether to send the unlocking instruction to the target bicycle through a wireless communication protocol according to the feedback.

12. The device of claim 11, further comprising:
the prompt information displaying module configured to:
display the first prompt information according to the first bicycle data as bicycle data, wherein the first bicycle data of the target bicycle is data that the server determines according to the current power information when the current power information of the target bicycle meets a preset first power condition; or display second prompt information according to a second bicycle data as bicycle data wherein the second bicycle data of the target bicycle is data that the server determines according to the current power information when the current power information of the target bicycle meets a preset second power condition.

\* \* \* \* \*